(12) United States Patent
Qi et al.

(10) Patent No.: US 11,852,462 B2
(45) Date of Patent: Dec. 26, 2023

(54) OPTICAL MODULE OF REDUCED SIZE AND ELECTRONIC DEVICE HAVING THE SAME

(71) Applicant: TRIPLE WIN TECHNOLOGY(SHENZHEN) CO.LTD., Shenzhen (CN)

(72) Inventors: Wei-Wei Qi, Shenzhen (CN); Jin-Hong Li, Shenzhen (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 163 days.

(21) Appl. No.: 17/330,958

(22) Filed: May 26, 2021

(65) Prior Publication Data
US 2021/0372782 A1      Dec. 2, 2021

(30) Foreign Application Priority Data
Jun. 1, 2020   (CN) .......................... 202020971506.8

(51) Int. Cl.
  *G01B 11/25*   (2006.01)
  *G06V 40/16*   (2022.01)
(52) U.S. Cl.
  CPC ............ *G01B 11/25* (2013.01); *G06V 40/166* (2022.01)

(58) Field of Classification Search
  CPC ..... G01B 11/25; G02B 27/425; G06V 40/166
  USPC .......................................................... 356/601
  See application file for complete search history.

(56) References Cited

U.S. PATENT DOCUMENTS

| | | | |
|---|---|---|---|
| 6,552,801 B1 * | 4/2003 | Akikuni ............ | G01B 9/02051 356/450 |
| 8,456,642 B2 * | 6/2013 | Sugiura ................ | G01B 9/0207 356/498 |
| 8,462,349 B1 * | 6/2013 | Rhoadarmer ...... | G01B 9/02081 356/491 |

FOREIGN PATENT DOCUMENTS

EP       3531064 A1 *   8/2019   ......... G01B 9/02015

* cited by examiner

*Primary Examiner* — Sunghee Y Gray
(74) *Attorney, Agent, or Firm* — ScienBiziP, P.C.

(57) ABSTRACT

An optical module with a reduced size but improved imaging includes a light source, a first lens, at least two first reflectors, at least two second reflectors, and a diffracting optical element. The first reflectors and the second reflectors are both inside the first lens and alternately arranged along an optical path of emitted light, which changes and lengthens its transmission path for face recognition focusing or similar purposes. An electronic device using the optical module is also provided.

14 Claims, 2 Drawing Sheets

100

OPTICAL MODULE OF REDUCED SIZE AND ELECTRONIC DEVICE HAVING THE SAME

FIELD

The subject matter relates to optical devices, and more particularly, to an optical module and an electronic device having the optical module.

BACKGROUND

Face Recognition Technology (FRT) is widely used in consumer electronics, automobiles, industry, medical, and communications. An optical module (such as dot projector) is an important element of FRT, which should be small and portable.

However, an optical path in such a dot projector is relatively short, which results in uncertain spot size and spot energy. Therefore, the size of a lens in the dot projector needs to increase to achieve satisfactory functionality over longer distances. However, A small size and a long optical path in an optical module may be difficult to achieve simultaneously.

BRIEF DESCRIPTION OF THE DRAWINGS

Implementations of the present technology will now be described, by way of embodiment, with reference to the attached figures.

DETAILED DESCRIPTION

Figure 1:
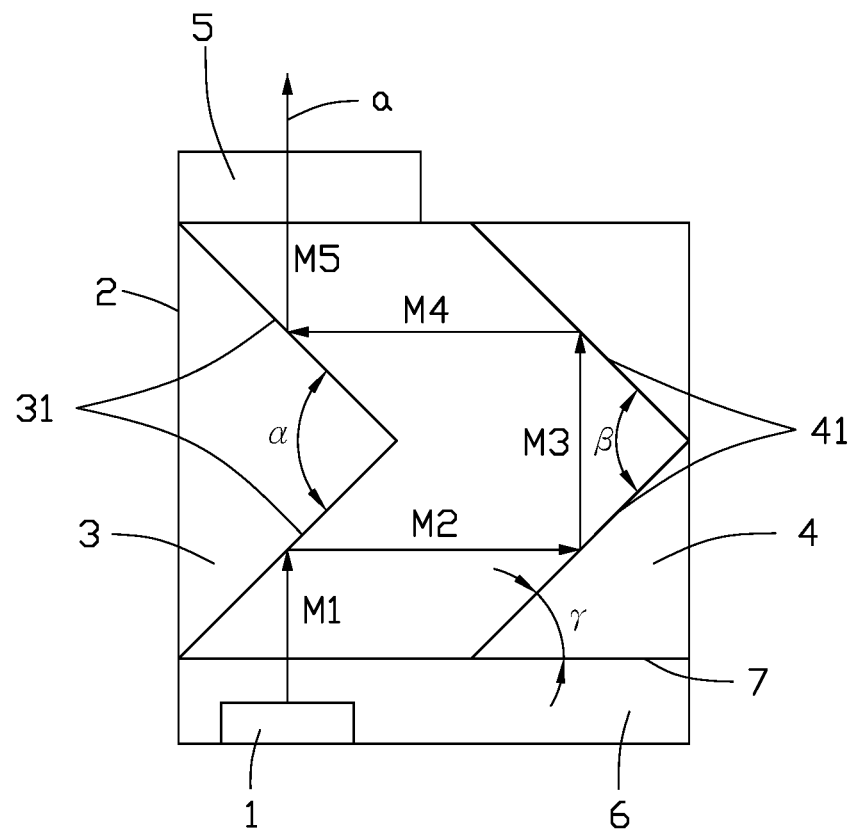
FIG. 1 is a diagrammatic view of an embodiment of an optical module according to the present disclosure.

It will be appreciated that for simplicity and clarity of illustration, where appropriate, reference numerals have been repeated among the different figures to indicate corresponding or analogous components. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 illustrates an embodiment of an optical module 100. The optical module 100 can be used in an electronic device. The optical module 100 comprises a light source 1, a first lens 2, at least two first reflectors 31, at least two second reflectors 41, and a diffracted optical element 5. The first lens 2 is positioned at a light emitting surface of the light source 1. The diffracted optical element 5 is positioned at a light incident surface of the first lens 2. Each of the first reflectors 31 and the second reflectors 41 is mounted inside of the first lens 2. The light source 1 generates light ("e-light"), which enters the first lens 2 and exits out of the diffracted optical element 5. The first reflectors 31 and the second reflectors 41 are alternately arranged along an optical path of the e-light, thereby changing the directions of light transmissions between each of the first reflectors 31 and the second reflectors 41. Thus, the optical path of the e-light can be elongated between the first reflectors 31 and the second reflectors 41.

When a volume of the lens 2 is small, by changing the quantities and positioning of the first reflectors 31 and the second reflectors 41 in the first lens 2, the transmission direction of the e-light between the first reflectors 31 and the second reflectors 41 can be changed in a very limited space, so as to further elongate the optical path of the e-light. Desired spot size and definition, and spot energy, can be obtained, and the optical module 100 can maintain a small size. Moreover, the optical module 100 can be designed to have a cube structure instead of a traditional cuboid structure, which further reduces the size of the optical module 100. In an embodiment, the optical module 100 may be a dot projector which may be used in a smart phone, as the front and rear cameras of a personal digital assistant (PDA), or other devices with FRT.

In an embodiment, the light source 1 is a spot light source, which can be used in the dot projector.

The first lens 2 can be used to fix and protect the first reflectors 31 and the second reflectors 41. A light transmittance of the first lens 2 is high to reduce energy loss of the e-light during the transmission.

In an embodiment, each of the first reflectors 31 and the second reflectors 41 is a planar total reflector. According to different requirements of spot size and spot energy, the quantities and positioning of the first reflectors 31 and the second reflectors 41 can be changed. Different arrangements mean that the positions of the first reflectors 31 and the second reflectors 41 or the angles therebetween may be different. The e-light can be reflected between the first reflectors 31 and the second reflectors 41 several times by varying the quantities and positioning of the reflectors.

In an embodiment, the optical module 100 further comprises at least one second lens 3 and at least two third lenses 4. Each second lens 3 comprises two first reflectors 31. The two first reflectors 31 are formed on adjacent surfaces of the second lens 3. Any adjacent first reflectors 31 are not parallel. A first angle α is formed between the two first reflectors 31. Each third lens 4 comprises one second reflector 41. The adjacent second reflectors 41 are cooperating with the two first reflectors 31 on the second lens 3. Any adjacent second reflectors 41 are not parallel. A second angle β is formed between the adjacent second reflectors 41. Referring to FIG. 1, each of the first angle α and the second angle β is 90 degrees. In other words, each first reflector 31 is parallel to one second reflector 41 next to the first reflector 31 along the optical path, which ensures optimal transmission of the e-light.

The first lens 2 comprises a bottom surface 7 facing the light source 1. A frontmost first reflector 31 along the optical path and a frontmost second reflector 41 along the optical path is not parallel to the bottom surface 7. A third angle γ is formed between a frontmost first reflector 31 along the optical path and the bottom surface 7, and between a frontmost second reflector 41 along the optical path and the bottom surface 7. The third angle γ being 45 degrees improves transmission of the e-light.

The diffracted optical element 5 can diffract and split the e-light to produce e-light of different wavelengths at different positions.

In an embodiment, the optical path of the e-light comprises a plurality of optical path sections, represented by M1, M2, M3, M4, and M5 (see FIG. 1). The total length of the optical path is equal to a sum of the optical path sections, that is M1+M2+M3+M4+M5.

In other embodiments, when the number of the first reflectors 31 and the second reflectors 41 increases, the total length of the optical path is equal to a sum of the optical path sections, that is S1+S2+S3+S4+S5+ . . . +Sn (where n denotes a positive integer). Supposing the spot size and the spot energy remain unchanged, the total lengths of the optical paths need to be equal to each other, that is, (M1+M2+M3+M4+M5)=(S1+S2+S3+S4+S5+ . . . +Sn). That is, when increasing the number of the first reflectors 31 and the second reflectors 41 in the first lens 2, the number of the optical path sections also increases, but the length of one optical path section is reduced. Therefore, fuller use of the internal space of the lens 2 can be made, and the size of the optical module 100 can be reduced.

In an embodiment, the optical module 100 further comprises a substrate 6. The substrate 6 is mounted outside the first lens 2. The light source 1 is positioned between the substrate 6 and the first lens 2. The substrate 6 can support and fix the light source 1, and prevent light leakage of the optical module 100.

Figure 2:
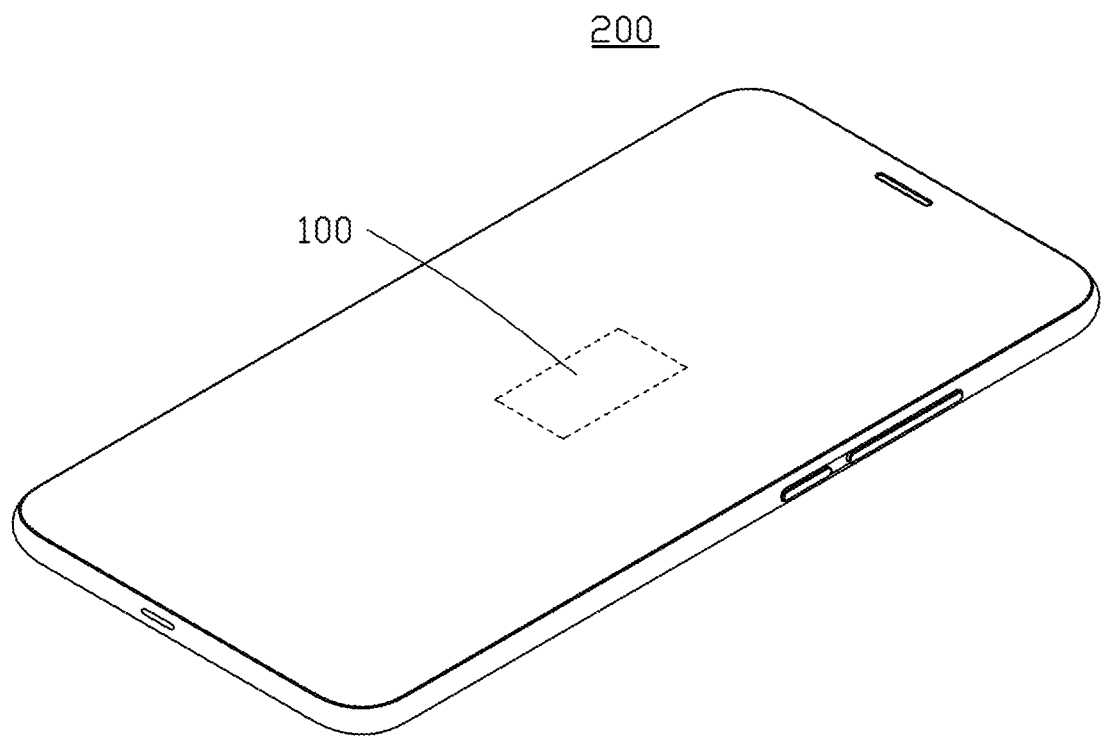
FIG. 2 is a diagrammatic view of an embodiment of an electronic device with the optical module as described in FIG. 1.

FIG. 2 illustrates an embodiment of an electronic device 200. The electronic device 200 comprises the optical module 100. In an embodiment, the electronic device 200 may be a smart phone. In other embodiments the electronic device may be front and rear cameras of a personal digital assistant (PDA), or other device with FRT function.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. An optical module comprising:
    a light source;
    a transparent optical block disposing at a light emitting surface of the light source;
    two first reflectors;
    two second reflectors; and
    a diffracted optical element disposing at a light emitting surface of the transparent optical block;
    wherein, each of the two first reflectors and the two second reflectors is mounted inside the transparent optical block, causing a light emitted from the light source to successively pass through one of the two first reflectors, one of the two second reflectors, another of the two second reflectors, and another of the two first reflectors, thereby changing directions of light transmissions between each of the two first reflectors and the two second reflectors,
    one of the two first reflectors is parallel to one of the two second reflectors next to the first reflector along an optical path, a first angle between the two first reflectors is 90 degrees, a second angle between the two second reflectors is 90 degrees, each of the two first reflectors and the two second reflectors is a planar total reflector.

2. The optical module of claim 1, further comprising at least one second lens and two third lenses, wherein each of the at least one second lens comprises two of the first reflectors.

3. The optical module of claim 2, wherein any adjacent first reflectors are not parallel, a first angle is formed between adjacent first reflectors; any adjacent second reflectors are not parallel, a second angle is formed between adjacent second reflectors.

4. The optical module of claim 3, wherein each of the first angle and the second angle is 90 degrees.

5. The optical module of claim 4, wherein the first lens comprises a bottom surface facing the light source, a frontmost first reflector along the optical path and a frontmost second reflector along the optical path is not parallel to the bottom surface.

6. The optical module of claim 1, further comprising a substrate, the substrate is mounted outside the transparent optical block, wherein the light source is mounted on the substrate and facing the transparent optical block.

7. The optical module of claim 1, wherein the light source is spot light source.

8. An electronic device comprising:
    an optical module comprising:
        a light source;
        a transparent optical block disposing at a light emitting surface of the light source;
        two first reflectors;
        two second reflectors; and
        a diffracted optical element disposing at a light emitting surface of the transparent optical block;
        wherein, each of the two first reflectors and the two second reflectors is mounted inside the transparent optical block, causing a light emitted from the light source to successively pass through one of the two first reflectors, one of the two second reflectors, another of the two second reflectors, and another of the two first reflectors, thereby changing directions of light transmissions between each of the two first reflectors and the two second reflectors,
        one of the two first reflectors is parallel to one of the two second reflectors next to the first reflector along an optical path, a first angle between the two first reflectors is 90 degrees, a second angle between the two second reflectors is 90 degrees, each of the two first reflectors and the two second reflectors is a planar total reflector.

9. The electronic device of claim 8, further comprising at least one second lens and two third lenses, wherein each of the at least one second lens comprises two of the first reflector.

10. The electronic device of claim 9, wherein any adjacent first reflectors are not parallel, a first angle is formed between adjacent first reflectors; any adjacent second reflectors are not parallel, a second angle is formed between adjacent second reflectors.

11. The electronic device of claim 10, wherein each of the first angle and the second angle is both 90 degrees.

12. The electronic device of claim 11, wherein the first lens comprises a bottom surface facing the light source, a frontmost first reflector along the optical path and a frontmost second reflector along the optical path is not parallel to the bottom surface.

13. The electronic device of claim 8, wherein the optical module further comprises a substrate, the substrate is mounted outside the transparent optical block, the light source is mounted on the substrate and facing the transparent optical block.

14. The electronic device of claim 8, wherein the light source is spot light source.

\* \* \* \* \*